$$d = \frac{\lambda}{2n \sin\theta}$$

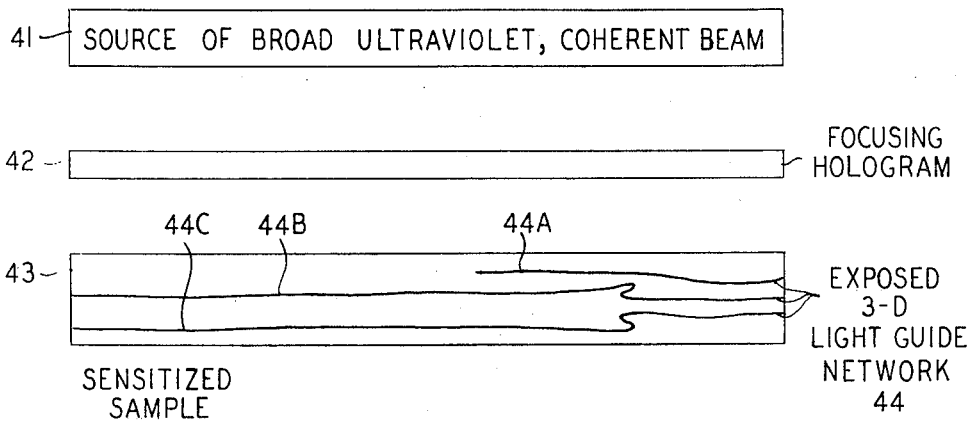
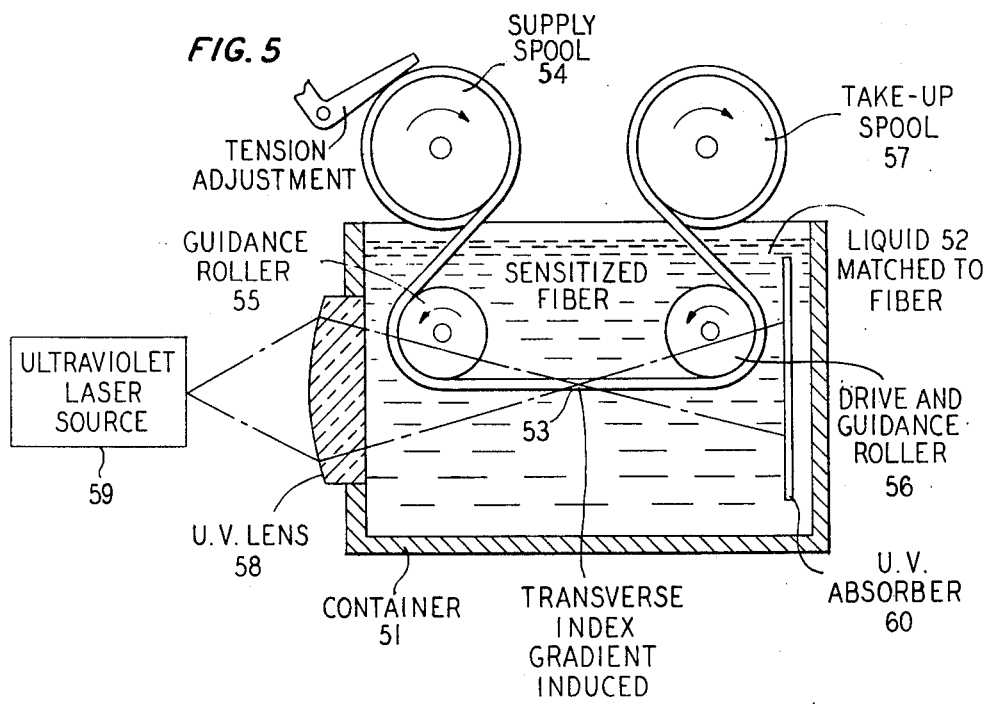
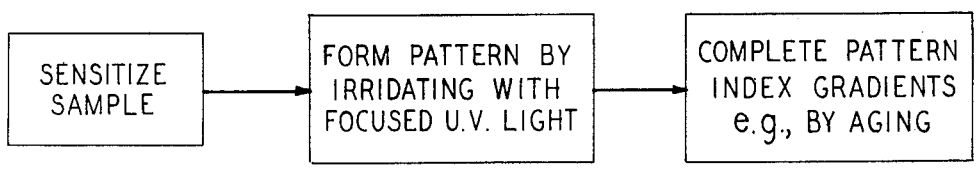

United States Patent Office 3,809,686
Patented May 7, 1974

---

3,809,686
TRANSPARENT MEDIA CAPABLE OF PHOTO-INDUCED REFRACTIVE INDEX CHANGES AND THEIR APPLICATION TO LIGHT GUIDES AND THE LIKE
Edwin Arthur Chandross, Berkeley Heights, Richard Lynn Fork, Holmdel, Ivan Paul Kaminow, New Shrewsbury, and Walter John Tomlinson III, Holmdel, N.J., assignors to Bell Telephone Laboratories, Incorporated, Murray Hill and Berkeley Heights, N.J.
Original application Mar. 19, 1970, Ser. No. 21,102, now Patent No. 3,689,264, dated Mar. 19, 1970. Divided and this application Mar. 1, 1972, Ser. No. 230,714
Int. Cl. C08f 3/68; G03c 5/00
U.S. Cl. 260—89.5 A    3 Claims

ABSTRACT OF THE DISCLOSURE

There are disclosed a variety of methods for producing light guides in suitably sensitized samples upon irradiation with focused ultraviolet light and subsequent aging. These methods are based upon the discovery that ultraviolet radiation from a mercury arc at 3650 A. or from an ultraviolet helium-cadmium ion laser at 3250 A. produces readily observable irreversible index of refraction changes in poly(methyl methacrylate) polymerized at low temperatures of around 40–50 degrees centigrade. Upon subsequent aging, the amount and gradient of the index change substantially increase.

---

This application is a division of application Ser. No. 21,102, filed Mar. 19, 1970, now U.S. Pat. No. 3,689,264.

BACKGROUND OF THE INVENTION

This invention relates to methods and apparatus for producing light guides and other patterns of elevated index of refraction in transparent bodies, particularly to optical methods for producing such light guides and patterns.

It has heretofore been proposed to produce guiding changes of index of refraction in transparent bodies by making the body with suitable changes in composition transversely along the proposed guiding path and by high-energy methods of damaging the transparent body, for example by neutron radiation. All these techniques are difficult to implement in practice and have not been found attractive. The problems of writing light guides into dielectric materials are discussed in the article by S. E. Miller in the Bell System Technical Journal, vol. 48, p. 2063 (September 1969).

SUMMARY OF THE INVENTION

Our invention is based upon the discovery of an optical method for producing light guides and other patterns of elevated index of refraction in suitably sensitized transparent bodies by irradiating the body with focused ultraviolet light.

Specifically, our invention involves the discovery that ultraviolet radiation from a mercury arc at 3650 A. or from a helium-cadmium ion laser at 3250 A., both in the ultra-violet, produces readily observable irreversible index of refraction changes in poly(methyl methacrylate) sensitized by the addition of ingredients to enable photo-induced cross-linking. The poly(methyl methacrylate) is prepared from methyl methacrylate polymerized at low temperatures of about 40–50 degrees centigrade after addition of the sensitizing ingredient. The sensitizing materials are apparently rendered ineffective by higher temperatures, the subsequent irradiation effect could not be observed in samples polymerized at or heated to substantially higher temperatures.

In addition, in the preparation of our samples, an appropriate amount (5–25 mg. per 100 ml.) of a selected initiator may be included to facilitate polymerization so far as that does not impair the sensitization. The initiator and its products should not absorb the exposing radiation; whereas the sensitizing ingredient or the polymer does. Some polymers of methyl methacrylate sensitized and prepared without an initiator also exhibit a comparable effect, in that ultraviolet radiation increases the index of refraction.

While optical changes in index of refraction in dielectric bodies such as lithium niobate have heretofore been observed in the presence of visible or ultraviolet radiation, the present effect involves a fundamentally different phenomenon producing much greater and irreversible fractional changes in index of refraction and also involves a subsequent completion of the index-of-refraction gradient not known in the previously employed types of optical damage. This completion is probably a relaxation of strain set up by the stresses of photo-induced cross-linking of polymers, so that while the initial exposure is effective to start the index change, the amount and gradient of the index change are subsequently substantially increased by a suitable step as aging. Preferably, the aging is continued until a stable condition is achieved.

The index change characteristic of our invention is tentatively attributed to ulraviolet-induced cross-linking of the polymer chains to change the density of the material. Further, some species of our invention employ peroxides as the sensitizing ingredients. Nevertheless, our invention should not be construed to depend upon the accuracy of the tentative explanation.

BRIEF DESCRIPTION OF THE DRAWING

Further features and advantages of our invention will become apparent from the following detailed description, taken together with the drawing, in which:

FIG. 4 is a partially pictorial and partially block diagrammatic illustration of an apparatus for practicing the the exposure step of a second specific method according to our invention;

FIG. 5 is a partially pictorial and partially block diagrammatic illustration of an apparatus for practicing the exposure step of a third specific method according to our invention;

FIG. 6 is a flow chart of the basic steps involved in the practice of our invention;

DESCRIPTION OF ILLUSTRATIVE EMBODIMENTS

Figure 1:
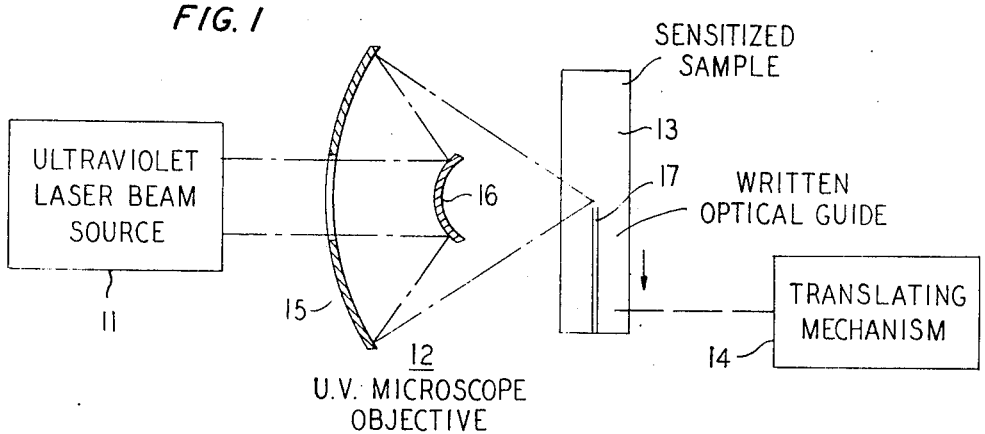
FIG. 1 is a partially pictorial and partially block diagrammatic illustration of an apparatus for performing the exposure step of one specific method according to our invention.

In FIG. 1 ultraviolet light from a suitable source 11 is focused by an ultraviolet transmitting microscope objective 12 to a desired region within (although it could also be upon the surface of) a suitably sensitized sample 13 which is translated transversely to the focused ultraviolet beam by a translating mechanism 14.

The ultraviolet laser beam source 11 is illustratively an ultraviolet cadmium ion laser operating at 3250 A. units, although in some experiments it was replaced by a mercury arc lamp operating at 3650 A. units. It may include suitable lenses for collimating the beam. Ultraviolet microscope objective 12 is of conventional type and includes an apertured reflecting element 15 and the convex reflecting element 16, which together bring the entire beam to a sharp focus at approximately twice the distance from reflector 15 as is reflector 16. A quartz refracting objective would also be suitable.

The sample 13 is translated through the focused beam by means of the translating mechanism 14, which may include rack-and-screw mechanisms adapted for translation of sample 13 in three orthogonal directions. Illustratively, one part of mechanism 14 is rigidly mounted with sample 13 in order to provide coupling of the prescribed motion to sample 13.

The apparatus of FIG. 1 was employed to practice the exposure step of a first specific method according to our invention as follows. First, the sample 13 was prepared in an evacuated capsule by polymerizing methyl methacrylate, including sensitizing peroxides, at low temperatures around 50 degrees centigrade with azobisisobutyronitride, $(CH_3)_2C(CN)$—N=N—$C(CN)(CH_3)_2$, as a polymerization initiator (5–25 mg. per 100 ml.) and without any additives to stabilize the poly(methyl methacrylate) against ultraviolet damage. This initiator is sometimes called AIBN. The sample was then mounted upon the mating part of translating mechanism 14 and disposed at the focus of ultraviolet microscope objective 12. Illustratively, the optical guide was written through the bulk of sample 13 by the motion of translating mechanism 14 and was continued to two lateral surfaces thereof. To write a guide of that nature, the translating mechanism 14 was caused to produce a desired set of continuous motions of sample 13. While control of the servomotors of translating mechanism 14 was done manually in our experiments, it could also be done by a programmed digital computer. Even before the aging step, there was obtained a continuous optical guiding path in sample 13 for a light of comparable or lower frequency, which could be introduced collinearly at an end of the path by a suitable lens. The path is illustratively shown, partially written, as the optical guide 17 in sample 13 in FIG. 1.

Upon completion of the translation of sample 13, it was removed from the focus of the ultraviolet laser beam and set aside to age. After the passage of several hours, the amount and gradient of refractive index change were found to have substantially increased. The incremental change produced by this aging process tends to diminish with time to a stable condition. The desirable aging time depends on the dimensions of the irradiated region. The total index change produced by this method was sufficiently large to allow bends of radius of one centimeter, which is as small as might be required in applications.

Using interferometric techniques, we have determined that for irradiation with 3650 A. ultraviolet light from the mercury arc, the induced index change is about $\Delta n = \frac{1}{2} \times 10^{-6} E$, where E is the exposure in joules per square centimeter. For irradiation with 3250 A. light from a cadmium ion laser, the index change is at least $\Delta n = 1 \times 10^{-5} E$; and this relationship appears to hold up to values of $\Delta n = 3 \times 10^{-3}$. Resolutions up to 5000 lines per millimeter have been observed. Our study has indicated that a large number of other plastics, especially other acrylates, should exhibit similar behavior, and other sensitizing ingredients are feasible and include those that readily promote cross-linking.

In some of these other substances or in any of these substances including different sensitizers, radiation at wavelengths outside the ultraviolet band, but otherwise employed according to the exposure steps of the present invention, may also be able to induce the index change.

With respect to other starting materials for sample 13, suitable sensitization of the sample before exposure and, to a lesser degree, completion of its refractive index gradient after exposure appear to be significant and may also be useful in related methods of writing optical guides such as those employing particle irradiation by electrons or neutrons.

Employing the embodiment of FIG. 1, we have experimentally demonstrated that fine (about one to 22 micrometers wide) light guides can be produced inside the plastic or on its surface by focusing the ultraviolet light as in FIG. 1 and translating the sample 13 along a desired path. The sample is then subsequently aged, as previously described. Both straight and curved guides, the latter having as small as about one centimeter radius of curvature, have been made to guide a 6328 A. red beam from a helium-neon laser. In principle, any light of frequency substantially different from those to which the sample has been sensitized may be successfully guided by being focused into an end surface of the guide in the sample 13. In addition, light of the same wavelength as the exposing light can be guided if the surrounding material has first been made sufficiently insensitive to further exposure.

When visible light was focused into the guides in our experiments, optical waveguide mode patterns were observed in the transmitted light as observed when extracted from the guide; and for a straight guide 1 centimeter long at least 90 percent of the incident light has been observed in the transmitted fundamental mode. Much of the mode loss may be the result of input and output coupling losses, which can be readily reduced.

With respect to the three steps employed in the method of FIG. 1, the following parameters appear to be pertinent.

In the sensitizing step, the methylmethacrylate is either autoxidized slowly or is subjected to diffuse ultraviolet radiation from a low-pressure mercury lamp in the presence of oxygen. The monomer thus obtained can then be polymerized with or without an initiator, so long as the sensitizing ingredient is not impaired. It is apparently desirable that the poly(methyl methacrylate) be polymerized at temperatures substantially below 100 degrees centigrade, since the effect that we employ could not be observed in samples that had been polymerized at 100 degrees centigrade, or that had been heated briefly (one hour) to 110 degrees centigrade. The best temperature of polymerization is apparently about 40–50 degrees centigrade but may range as low as nearly 25 degrees centigrade without being undesirably slow and as high as 75 degrees centigrade without substantial loss of sensitization.

It is also possible to sensitize the samples by the addition of peroxides, such as dicumyl peroxide or tertiary-butyl perbenzoate. Typically, these peroxides have been added before polymerization but might be added to sufficiently thin samples after polymerization.

In the exposure step, it appears desirable to focus the light beam as sharply as possible, or at least to a degree that the desired index-of-refraction gradient across the guide will be automatically provided by the cross-sectional characteristics of the light at the waist of the beam and by its convergence and divergence from that waist. Of course, it should be noted that the diameter and axial extent of the beam waist can be adjusted by varying the angle of convergence of the incident ultraviolet beam. Thus, if a guide of larger cross section is desired, that angle of convergence can be decreased so that the beam waist diameter increases.

In the aging step, the parameters do not appear to be critical. We have found good results simply by leaving the exposed samples in a dark place at a temperature below about 60 degrees centigrade for a period of several days. The minimum period of aging desirable can be very small for small irradiated regions; and the maximum period of aging that appears to be desirable is one week, after which negligible change occurs.

With respect to the use of the guide thus produced, it may be noted that the wavelength of the light to be guided is preferably outside the wavelength range of photosensitivity, which encompasses the wavelength of the ultraviolet light which exposed the sample 13, in order to avoid further change in the cross-sectional variation of index of refraction within the guide. For poly(methyl methacrylate), we prefer that the wavelength of light to be guided be longer than about 4000 A.

Figure 2:
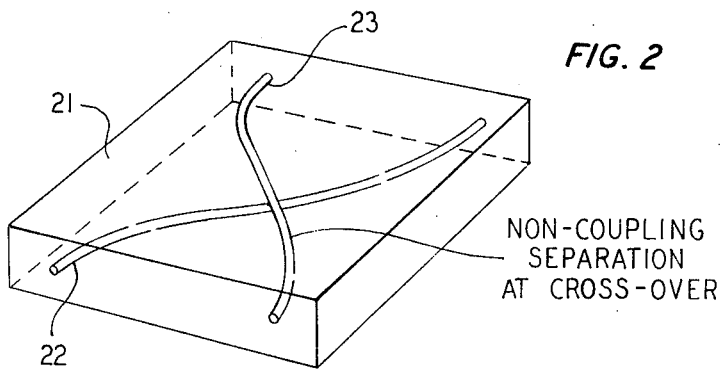
FIG. 2 is a pictorial illustration of a sample in which two light guides have been written according to our invention so that they cross over with a non-coupling separation therebetween.

A typical product of the methods of FIG. 1 is shown in FIG. 2. The sensitized and then exposed sample 21 has the nonintersecting optical guides 22 and 23 written therein by the method of FIG. 1. Guides 22 and 23 typically have an index gradient across their cross sections of about $3 \times 10^{-3}$ and have an effective diameter of 2 micrometers. The guides 22 and 23 in both cases extend to opposite surfaces of the sample 21 and have a separation at their crossover, that is, at the region of their minimum separation, which is at least 10 micrometers, for example 50 micrometers, between their limits defined by their effective diameters. This separation is a noncoupling separation, which means that there is negligible exchange of light energy between the guides 22 and 23 when the wavelength of the light propagated therein is less than one micrometer.

Figure 3:
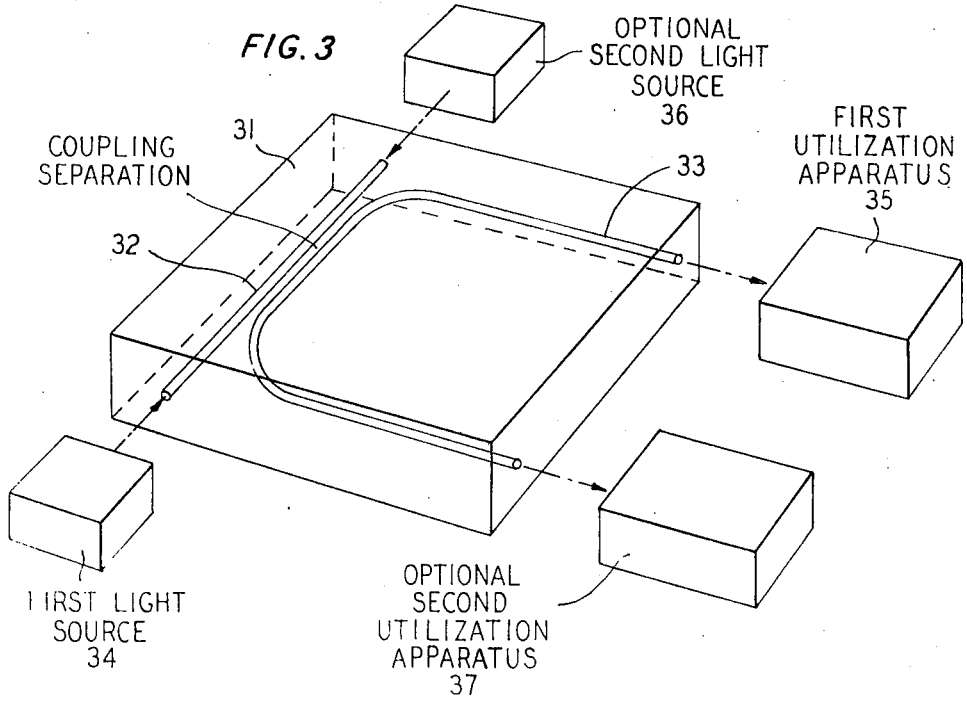
FIG. 3 is a partially pictorial and partially block diagrammatic illustration of one type of apparatus in which light guides according to our invention may be used as a directional coupler.

Another typical product of the method of FIG. 1 is shown in FIG. 3. The sensitized and exposed sample 31 of polymethyl methacrylate has the guides 32 and 33 therein, which have parameters similar to guides 22 and 23 of FIG. 2. The principal difference from the sample of FIG. 2 is that in the sample 31 of FIG. 3 the light guides 32 and 33 are separated by less than 10 micrometers, e.g., one micrometer, so that substantial coupling of light between the guides occurs when the wavelength of the light is at least as long as 0.4 micrometer (4000 A.).

It will be noted that this coupling between the guides 32 and 33 is a directional coupling so that light from a first source 34 introduced at one end of guide 32 is coupled into guide 33 to propagate in such a direction that it emerges eventually to propagate toward the first utilization apparatus 35. On the other hand, light from the optional second light source 36, used in the absence of source 34 and directed into the opposite end of guide 32, is coupled into guide 33 to propagate therein in such a direction that it eventually emerges therefrom to propagate toward the optional second utilization apparatus 37.

More broadly, the circuit aspects of the use of products made according to the method of our invention are covered in more detail in articles by E. A. J. Marcatili in the Bell System Technical Journal, vol. 48, p. 2071 (September 1969) and vol. 48, p. 2103 (September 1969).

A second specific exposure step of a method according to our invention is practiced with the apparatus shown in FIG. 4.

In FIG. 4, a source 41 of a broad ultraviolet coherent beam is directed through a previously exposed and developed hologram 42 which directs the ultraviolet beam from source 41 into a pattern in a sensitized sample 43, according to well-known holographic techniques. The pattern in sample 43 as produced by hologram 42 in response to light from source 41 results from focusing of the light as well as the exclusion of it from certain areas of the sample 43. This pattern of focused light produces a three-dimensional light guide network 44 in sample 43. This network includes the guides 44A, 44B and 44C. The guides 44A–44C may have characteristics similar to those disclosed above in connection with the guides described in FIGS. 1–3.

The exposure step of FIG. 4 may be characterized as a holographic exposure step; that is, the sensitized sample is holographically exposed to form the guide network 44A, 44B and 44C in a way which is predetermined by the original formation of hologram 42.

Typically, a photographic film is exposed by interfering light wavefronts or beams called the subject beam and the reference beam and then developed to make hologram 42. The formation of hologram 42 is done by methods which are now well known in the art and need not be discussed in detail here. For example, focusing holograms such as hologram 42 have been used heretofore in order to make two-dimensional photographic prints from holograms containing three-dimensional information. Specifically, focusing holograms such as hologram 42 are formed by exposing a suitable photographic film to a plane wave reference beam and an angularly-displaced subject beam formed to simulate the desired pattern, for example, to make the subject beam simulate guides 44A–44C. The feasibility of three-dimensional focusing with holograms is shown by the IBM Technical Disclosure Bulletin, vol. 11, 1168 (February 1969) in the article by T. J. O'Hara et al.

Our invention, and advantageously the species of FIG. 4, can be applied to making optical memories, provided that the sample 43 has been sensitized in the manner according to the invention, as described above, and then, after exposure, is allowed to age after the manner of the invention, as described above.

The exposure technique of FIG. 4 should not be confused with making a hologram in sample 43. Such possibilities are mentioned below.

Still a third variation of a method according to our invention may be practiced with the aid of the apparatus shown in FIG. 5. Here again, the illustrated apparatus is mainly useful during the exposure step, the sensitization steps and aging steps being the same as heretofore.

Thus, for the exposure step, the apparatus of FIG. 5 includes the container 51 filled with a liquid 52 which is typically a clear oil index-matched with a fiber 53 of poly(methyl methacrylate) which is to be formed into an optical guide according to the method of the present invention. Fiber 53 of poly(methyl methacrylate), of about two micrometers diameter, is sensitized and polymerized at about 50 degrees centigrade as heretofore and then wound onto the supply spool 54. From the supply spool, the fiber 53 is threaded over the first guidance roller 55 of transparent index-matched material, thence under the second guidance roller 56 of transparent index-matched material and therefrom over the take-up spool 57, upon which it is aged after the manner of the invention. It will be noted that guidance rollers 56 and 55 are immersed in the liquid 52 so that the fiber 53 extending therebetween is centrally located in the body of the liquid.

The left-hand wall of container 51 has an ultraviolet lens 58 disposed therein which serves to focus ultraviolet light from a suitable laser source 59 upon the fiber 53 midway between rollers 55 and 56 in order to expose it to create the transverse variation of index of refraction suitable for a guide.

As in the previous exposure steps, the intense ultraviolet light at the waist of the focused beam has an intensity sufficient to create a change in index such that the index is greatest at the center of the fiber and least at the edge of the fiber, with the total difference in index between the center and the edge being about $5 \times 10^{-4}$, or more generally, in terms of the electric field, being about $$1 \times 10^{-5} \times E$$

E being the ultraviolet energy for irradiation with 3250 A. light from the cadmium ion laser or being about $$\tfrac{1}{2} \times 10^{-6} E$$

for irradiation with 3650 A. light from the mercury arc.

This exposure step differs from the previous exposure steps in that the sensitized medium, as it is exposed, is translated axially along the path of the ultraviolet beam.

This collinear or axial translation is effective for the purposes of the invention because the ultraviolet light outside the region of its waist has an intensity too low to have substantial effect upon the index of the fiber according to the above-described approximately linear relations between the change in index and ultraviolet energy. The waist diameter of the beam is that minimum diameter, for an intensity of $e^{-1}$ of the central or axial intensity, which occurs at the point along fiber 53 at the theoretical focus point of the lens 58.

As the fiber 53 approaches the waist of the beam from the left, it experiences very little index change until it enters a region extending for a few microns either way around the waist of the beam. It is then exposed in an axially symmetrical manner. Thereafter, it is translated out of the waist of the beam and experiences again very little effect, so that a very smooth and axially symmetrical transverse variation of index corresponding very closely to the gradient of light intensity at the beam waist is obtained.

The fiber 53 is then wound up upon the take-up spool and aged thereon, after which it may be used for optical guiding of light of wavelength outside its range of photosensitivity.

It will be noted that inadvertent damage to the index gradient is prevented by the ultraviolet absorber 60, which is disposed near the wall of container 51 opposite lens 58 to prevent reflection of ultraviolet light back toward fiber 53.

This exposure step readily may be described in detail mathematically; and the other exposure steps may be described by a somewhat modified analysis.

Assuming that the ultraviolet light is produced by a laser of the helium-cadmium ion type in the fundamental Gaussian mode at 3250 A., it is possible to describe the effective integrated density of radiation within the poly (methyl methacrylate) resulting from the various methods of applying the radiation. By making a further assumption, namely, that the refractive index change at any point is directly proportional to the integrated radiation intensity there, one can then arrive at an estimate of the equilibrium radius of the light beam traveling in a light guide formed by the ultraviolet radiation by each of the respective different exposure steps.

An axially symmetrical Gaussian beam can be described by its power density at a point $z,r$ (where $z$ is the distance from the waist of the beam and $r$ is the radial distance from the axis of the beam in a cross section of the beam) by the following:

$$p(z, r) = p(z, 0) e^{-\frac{2r^2}{w_z^2}} \qquad (1)$$

$p(z,0)$ being the power density on the axis at $z$, and $w_z$ the so-called beam radius at $z$, i.e., the distance at which the amplitude of the radiation is $e^{-1}$ of the amplitude on the axis. The factor 2 in the above equation accounts for the fact that we are dealing with intensities and not amplitudes.

$w_z$ is given by the following:

$$w_z^2 = w_0^2 [1 + Z^2] \qquad (2)$$

where $w_0$ is the beam radius at the waist, and $Z$ is given by $$Z = z \cdot \frac{\lambda}{\pi w_0^2} \qquad (3)$$

where $\lambda$ is the wavelength in the medium.

With the assumption of no loss in the medium, the principle of conservation of energy leads to $$w_z^2 p(z, 0) = w_0^2 p_0 \qquad (4)$$

where $p_0$ is the power density on the axis at the waist and is the highest power density in the beam.

It is easy to show that P, the total power in the beam, is given by $$P = \tfrac{1}{2} \pi w_0^2 p_0 \qquad (5)$$

Introducing another dimensionless variable $$R = \frac{r}{w_0}$$

we can describe the power density anywhere in the beam by a dimensionless number $$D = \frac{p(z, r)}{p_0}$$

as follows:

$$D = [1+Z^2]^{-1} \exp -\{2R^2[1+Z^2]^{-1}\} \qquad (6)$$

A Gaussian beam with this intensity distribution in the medium, in which the refractive index is proportional to the incident radiation, will give rise to a distribution of refractive index of identical proportions, provided the index change is very small. It will be noted that experimentally it has been observed that in the effective range of exposure intensities, the refractive index change in the methods of the present invention is approximately proportional to the integrated incident radiation (or ultraviolet energy). Therefore, Equation 6 appears to be applicable to the distribution of change in refractive index.

In a plurality of our methods, we envisage relative motion between the beam and the medium; and at least two of these motions have been described in the embodiments of FIGS. 1 and 5. A third motion that could be used would be the rotation of the medium about an axis perpendicular to and intersecting the beam axis. This could be achieved in the embodiment of FIG. 5 if the spacing between rollers 55 and 56 were eliminated so that, in essence, there was a single guidance roller. Of course, it would also be possible to use combinations of the motions employed in FIG. 1 in FIG. 5 and in the just-described modification of FIG. 5.

A further mathematical analysis of the transverse motion employed in FIG. 1 can be employed to provide a description of the relative power density ratio which is effective in providing a corresponding linearly related change in index $\Delta n$. The following is the power density ratio D $$D_\perp = \frac{w_0}{w_z} \cdot e^{-\frac{2x^2}{w_z^2}} \qquad (7)$$

$$D_\perp = (1+Z^2)^{-1/2} \exp -[2X^2(1+Z^2)^{-1}] \qquad (8)$$

where $X = x/w_0$ and $$Z = z \cdot \frac{\lambda}{\pi w_0^2}$$

as before.

The contours of equal power density ratios between zero and nine-tenths resemble ellipses when both X and Z are small. One can then expand Equation 8 in powers of X and Z.

$$D_\perp \approx 1 - \tfrac{1}{2} Z^2 - 2X^2 + \tfrac{3}{8} Z^4 + X^2 + 2X^4 + \ldots \qquad (9)$$

where it is assumed that the refractive index change is proportional to the electric field intensity.

Equation 9 shows that for small enough values of X and Z the irradiated medium of FIG. 1 or FIG. 4 is like a lens-like optical guide, although it is not a rotationally symmetrical one as has been commonly employed in the optical guiding art. This lack of the usual rotational symmetry means that an optical mode propagating in such a guide will have elliptical symmetry rather than circular symmetry. The quasi-elliptical contours of equal power density can be described by their axes as follows:

$$x_0 = w_0 \cdot \sqrt{\tfrac{1}{2}(1-D)} \qquad (10)$$

and $$z_0 = \frac{\pi w_0}{\lambda} \cdot \sqrt{2(1-D_\perp)} \qquad (11)$$

so that $$\frac{x_0}{z_0} = \frac{\lambda}{2\pi w_0} \qquad (12)$$

At this point it is convenient to recall that the half angle of convergence $\theta_0$ of a Gaussian beam is given by $$\theta_0 = \frac{\lambda}{\pi w_0} \qquad (13)$$

so that one can write $$\frac{x_0}{z_0} = \frac{\theta_0}{2} \qquad (14)$$

It is not unexpected that one has to use a beam with a very large convergence half angle (which means a very low $f$/number lens) if one wishes to obtain a guide cross section, according to the method of FIG. 1 and FIG. 4, with proportions not too different from 2:1.

The difference in the refractive index distribution in a guide with elliptical symmetry as contrasted to one with the more circular symmetry resides mainly in the consideration that we shall now have to consider beam axes separately in two orthogonal coordinates, at least for the exposure steps employed in FIGS. 1 and 4.

Let us describe the refractive index distribution due to irradiation by $$n(x, z) = n_0 \left[ 1 + \frac{\Delta n}{n_0} \cdot D_\perp \right] \qquad (15)$$

where $\Delta n$ is the maximum change at the waist of the irradiating beam. An approximate equation for the equilibrium beam radius $w_{0z}$ in the $z$ direction is given by the following:

$$\frac{\Delta n}{n_0} \left[ \frac{\lambda}{\pi w_0^2} \right]^2 = n_0 \left[ \frac{\lambda'}{\pi w_{0z}^2} \right]^2 \qquad (16)$$

so that $$w_{0z} = w_0 \cdot \frac{n_0 \lambda'}{\lambda} \cdot \sqrt{\frac{1}{\Delta n}} \qquad (17)$$

where $\lambda'$ is the wavelength of the guided light.

On the other hand, an approximate equation for the equilibrium beam radius in the $x$-direction is as follows:

$$w_{0x} = \tfrac{1}{4} \cdot \sqrt{\Delta n} \cdot \sqrt{\frac{n_0}{2\pi}} \; w_0 \lambda' \qquad (18)$$

A better answer with respect to these parameters could be obtained from a solution of the wave equation from the actual refractive index distribution, perhaps by the means of the Fox and Li computational method, as set forth in their well-known article on focusing lens-like media, "Resonant Modes in a Maser Interferometer," Bell System Technical Journal, 40, 443 (1961).

For the axial translation of a sample 53 in FIG. 5 with respect to the ultraviolet laser beam which performs the exposure step, a similar set of calculations may be carried out which will provide a solution of the relative or normalized power density as given by the following equation:

$$\Delta_{11} = e^{-R^2} I_0(R^2) \qquad (19)$$

where $$R = \frac{r}{w_0}$$

as before, and the other quantities are as defined above. When $R^2$ is $\ll 1$, $$\Delta_{11} = 1 - R^2 + \tfrac{3}{4} X^4 \ldots \qquad (20)$$

which shows again that for small values of $R^2$ a medium in which the refractive index is proportional to the applied ultraviolet intensity will act like a lens-like medium. In contrast to the analysis made above for FIGS. 1 and 4, the radial intensity distribution obtained in this case is circularly symmetrical and approximates much more closely the sort of index distribution which produces guiding in a gaseous optical guide, that is, the radial intensity distribution is very close to the desired quadratic distribution.

It should be understood that the index distributions described above are quite useful for optical guiding and produce relatively little mode conversion. The degree of mode conversion presently observed experimentally is primarily due to the effects of surfaces at the entrance and exit of the guide and not due to the converting or distorting influences of the transverse refractive index distribution within the guide. Thus it is considered that optical guides made according to all of the above-described methods are practical and useful for the purpose of guiding visible light beams of suitable wavelength, as described above.

It should also be understood that mode conversions due to effects at the entrance and exit of the guide can be reduced by improving the quality of the entrance and exit surfaces, which is a matter of ordinary skill in the art, inasmuch as those surfaces can be prepared carefully and then highly polished and anti-reflection-coated. Mode conversions can also be reduced by using other methods for coupling into the light guides.

Our analysis shows that all the above-described specific methods fall into the generic method set forth in flow diagram form in FIG. 6. Thus, in the first step, the sample is sensitized to the ultraviolet radiation to which it is to be exposed. Typically, the sensitization step according to our invention involves the inclusion of peroxides in an acrylate to enable photo-induced cross-linking in the poly(acrylate). It is typically followed by the polymerization step, although the order of these steps may not be critical.

In the exposure step, the sensitized sample is then irradiated with focused ultraviolet light having its greatest intensity where the guide is to be formed. The ultraviolet light is chosen to promote the further structural development of the complex molecules such as the cross-linking of some molecules among the molecules in the sensitized sample.

In the final step the optical guide or patterns of optical guides in the sample is then completed, typically by aging. The period of time for which aging may be appropriate will depend upon the particular sensitization and exposure of the sample.

While we do not wish our invention to be limited by the following theoretical explanation, this tentative explanation tends to correspond to our experimental observations.

During exposure, it is believed that the ultraviolet light is absorbed by the peroxides to form active radicals that promote cross-linking of the polymer chains. It can be appreciated that the molecular structural process of cross-linking would increase the density in the exposed regions.

Moreover, it appears that the cross-linking initially creates stresses that tend to pull the polymer chains together. The material tends to resist these stresses, so that strains are set up in the sample during exposure. These strains can be relieved and the stresses reduced by the flow of material into the irradiated region from the surrounding region; but much of the inflow may not occur immediately. Thus, the initial increase in density is attributable to the cross-links and associated immediate displacement of material.

In any event, during exposure the density of the material rises in the exposed region and indicates a more complex structure.

During the aging step, the last-described cross-linking or other structural change during exposure produces strains and resulting stresses in the sample where it was exposed, as mentioned above. Relaxation of the strains and consequent decrease of the stresses could then take place by the flowing of material into the irradiated areas over a period of time. The result is a further increase in the density and index of refraction in those areas and a steeper gradient of those quantities.

From the foregoing explanation, the peroxides are important during exposure and the initiator plays no role. It would appear desirable to convert all of the remaining stable initiator by-product remaining outside the guides to a form not capable of response to a later exposure to ultraviolet exposing radiation. The achievement of this objective can be obtained partially by using as small an amount of initiator in the starting sample as will produce the above-described results.

Suitable starting materials for the generic method of FIG. 6 should include a large number of plastics which are useful for optical transmission and susceptible to photochemical change in index of refraction. We suggest polymethyl methacrylate and other methacrylates and acrylates, as some alternatives. In some of these substances, radiation at wavelength outside the ultraviolet band may also be able to induce the index change. In those cases the radiation to be guided will typically be of longer wavelength than the exposing radiation, although it could also be a shorter, non-damaging wavelength. In addition, for some of these other materials, particle radiation such as electrons or neutrons may also be effective to perform the exposure step and will advantageously be employed according to our invention, in that the exposure step will be preceded by the sensitization step and followed by the aging step.

It should also be observed that the method according to our invention may also be useful in forming an optical memory. The method of forming an optical memory according to our invention will differ from the methods of making optical memories by optical damage in lithium niobate, as discussed above, in that the sample is sensitized and then the completed index changes are aged acccording to the method of our invention. The exposure step would not differ substantially from that of previous optical memory proposals employing index changes in transparent media. Of course, such index changes can be accomplished in three dimensions, thereby providing a very large total volume and a very high density of information storage.

In addition, our method can be used to produce three-dimensional holograms for general use. In this case, interfering subject and reference beams of coherent ultraviolet light are used to expose the sensitized sample.

A further modification of our invention resides in the fact that the wavelength range for exposure for poly(methyl methacrylate) sensitized according to our invention extends throughout most of the range of the soft ultraviolet which we have been able to investigate, namely, from about 4000 A. to about 2800 A. Other materials of course, will have a somewhat different range of exposure response. Furthermore, other sensitizers may be added to poly (methyl methacrylate) and to other plastics, poly(acrylates) and polymerizable materials to make it possible to effect the exposure step with visible rather than ultraviolet radiation.

Figure 7:
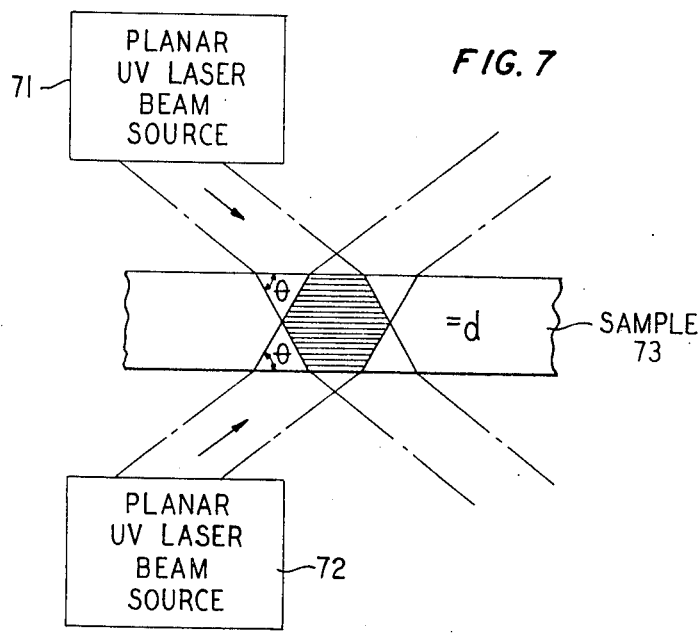
FIG. 7 is a partially pictorial and partially block diagrammatic illustration of an apparatus for exposing a sample to make a reflector by the method of our invention.
Figure 8:
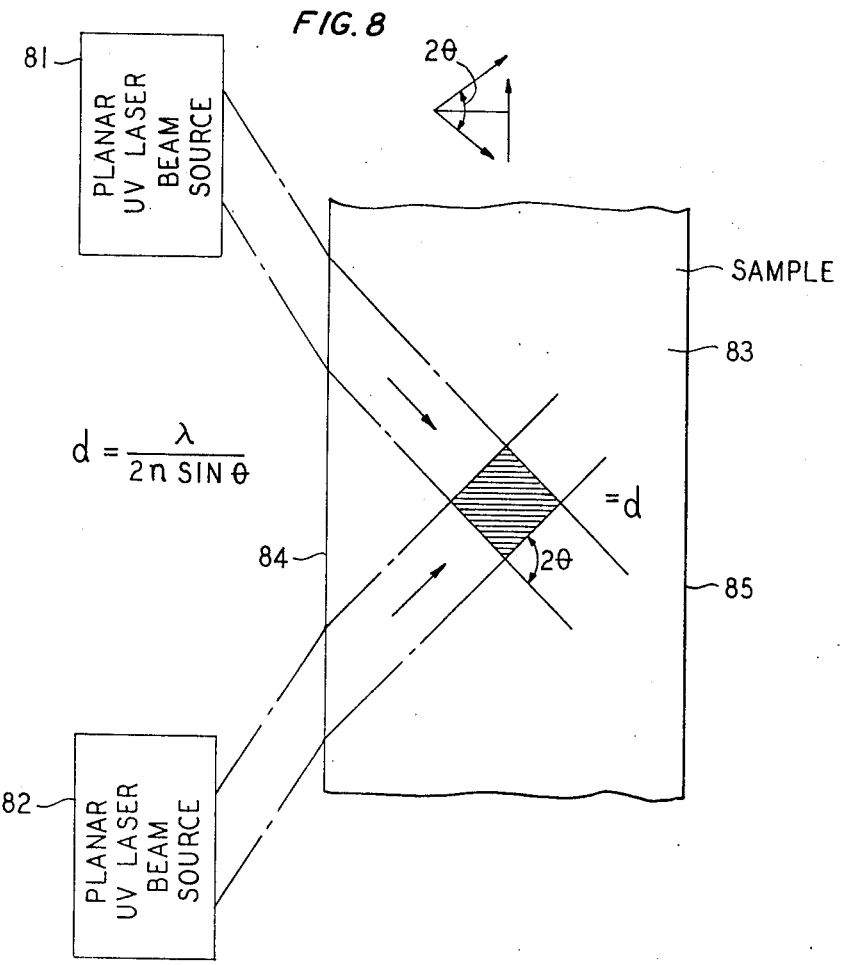
FIG. 8 is a modification of the illustration of FIG. 7 to generalize its applicability.

Further applications of our invention are suggested in FIGS. 7 and 8.

It is often necessary to produce resonant reflectors— a means for reflecting light of particular wavelength—in optical waveguide or other applications. See S. E. Miller's above-cited Bell System Technical Journal articles; also H. Kogelnik, Bell System Technical Journal, 48, 2909 (1969). Such reflection may be produced by creating a series of parallel planes of alternating high and low refractive index, with spacing $d$ between equivalent planes, to form a Lippmann-Bragg reflector. The means for accomplishing the required index variation in poly(methyl methacrylate) is shown in FIGS. 7 and 8 where two ultraviolet beams, which may be derived from the same laser by beam splitters, intersect at an angle $2\theta$. The interplanar spacing is governed by the Bragg formula $$d = \frac{\lambda}{2n \sin \theta}$$

where $\lambda$ is the wavelength of the irradiating beams from sources 71 and 72 or 81 and 82 and $n$ is the refractive index of the medium 73 or 83. The angle $\theta$ is measured inside the medium 73 or 83 and refraction at the surface must be taken into account. If $\theta$ is less than the critical angle for the total internal reflection, $$\cos \theta_c = \frac{1}{n}$$

where $\theta_c \sim 48°$ for poly(methyl methacrylate). Then, the input surfaces in FIG. 6 must be polished at an angle oblique to the reflecting planes.

Alternatively, the beam incident from below can be eliminated, and the interfering beam will be produced by total reflection of the upper beam from the lower surface. In general, in FIG. 7, the surfaces of the sample may be at oblique angles to the reflecting planes. For example, diffraction gratings would be made by the method of our invention, with this adaptation.

FIG. 8 differs from FIG. 7 in that the parallel planes of high and low index are not bounded by any surfaces of the sample. This figure shows that the sample surfaces can be substantially removed from the reflecting parallel planes.

Such parallel planes of high and low index may also serve as one-dimensional guides for light entering (e.g., from the left) between them at more than the critical angle $\theta_c$ with respect to their normal. Thus, the device of FIG. 8 can be either a reflector or a guide. In the latter case, parallel polished sample surfaces 84 and 85 are provided normal to the parallel planes of elevated index. Light to be guided can then be easily introduced.

We claim:

1. A composition of matter of the type including selected regions of elevated index of refraction suitable for guiding an optical beam, said composition of matter being produced by the process comprising the steps of
   sensitizing a starting sample of a transparent polymerizable acrylate by introducing a peroxide therein to provide subsequent molecular structural change tending to increase the index of refraction thereof upon exposure to ultraviolet radiation,
   polymerizing said sample at a temperature below 100° C. which does not impair the sensitization of said sample provided in said sensitizing step,
   exposing said sample to focused ultraviolet radiation to produce therein regions of increased index of refraction in a selected pattern, and
   completing the index change in said regions by aging said sample to relieve strains therein and to promote the migration of material into said regions.

2. A composition of matter according to claim 1 in which said peroxide is selected from the group consisting of dicumyl peroxide and tertiary-butyl perbenzoate.

3. A composition of matter according to claim 1 in which said transparent polymerizable acrylate is methyl methacrylate.

References Cited

UNITED STATES PATENTS

| | | | |
|---|---|---|---|
| 2,553,325 | 5/1951 | Loritsch | 260—89.5 A |
| 3,053,742 | 9/1962 | Smith | 204—159.14 |
| 3,689,264 | 9/1972 | Chandross et al. | 96—35.1 |

HARRY WONG, JR., Primary Examiner

U.S. Cl. X.R.

96—27, 35.1, 115; 204—159.14